United States Patent [19]

Francis et al.

[11] Patent Number: 4,925,606
[45] Date of Patent: May 15, 1990

[54] METHOD FOR ENHANCING THERMAL EXPANDABILITY OF DIRECT-INJECTION FOAMS

[75] Inventors: Peter S. Francis, Wallingford; Thomas M. Chapman, Downingtown, both of Pa.

[73] Assignee: Arco Chemical Technology, Inc., Wilmington, Del.

[21] Appl. No.: 418,592

[22] Filed: Oct. 10, 1989

[51] Int. Cl.$^5$ .............................. C08J 9/08; C08J 9/36
[52] U.S. Cl. ........................................ 264/50; 264/53; 264/DIG. 15; 521/58; 521/79; 521/81; 521/97; 521/146; 521/139; 521/147; 521/143
[58] Field of Search ................... 264/50, 53, DIG. 15; 521/58, 79, 81, 97, 139, 143, 146, 147

[56] References Cited

U.S. PATENT DOCUMENTS

| | | | |
|---|---|---|---|
| 2,531,665 | 3/1950 | Booth | 18/48 |
| 2,848,427 | 7/1958 | Rubens | 260/2.5 |
| 3,243,485 | 10/1966 | Griffin | 264/51 |
| 4,150,077 | 4/1979 | Slocomb | 264/DIG. 15 |
| 4,420,448 | 12/1983 | Krutchen | 264/DIG. 15 |
| 4,456,573 | 6/1984 | Ragazzini et al. | 264/DIG. 15 |
| 4,485,059 | 11/1984 | Krutchen et al. | 264/DIG. 15 |
| 4,804,507 | 2/1989 | Rubens et al. | 264/DIG. 15 |

*Primary Examiner*—Morton Foelak
*Attorney, Agent, or Firm*—Lewis J. Young

[57] ABSTRACT

The process of enabling foam moldings to expand further than otherwise by impregnating the expanded sheet with inorganic gases such as carbon dioxide, nitrogen, air and other pneumatogens prior to reheating to effect expansion.

10 Claims, No Drawings

METHOD FOR ENHANCING THERMAL EXPANDABILITY OF DIRECT-INJECTION FOAMS

BACKGROUND OF THE INVENTION

The present invention is directed to a method of enhancing the thermal expandability of polystyrene, styrene copolymers, polymethyl methacrylate, methyl methacrylate copolymers, crosslinked variations thereof and interpenetrating networks thereof with carbon dioxide.

The preparation of molded foamed plastic articles is well known wherein plastic particles are impregnated with organic blowing agents, expanded to preliminary low density particles, placed into a mold and finally expanded to the desired fully expanded article. The most used organic blowing agent is n-pentane. Unfortunately, n-pentane is now considered to be hazardous in the quantities which are removed during the molding. Further, the residual pentane in the molded parts continues to escape into the atmosphere for an extended time after removal of the part from the mold.

The chlorofluoromethanes have been used to eliminate the problems with the pentanes. The recent findings that the usual chlorofluoromethanes cause loss of the ozone layers in the atmosphere, has made it necessary to look for replacements, such as the safer chlorodifluoromethane.

To help eliminate this problem, various inorganic blowing agents such as carbon dioxide, nitrogen, air and other pneumatogens have been tried.

U.S. Pat. No. 2,531,665 teaches to impregnate polymers at 100°-25° C. with inert gas under pressure followed by cooling and reheating in a mold to bring about expansion.

U.S. Pat. No. 2,848,427 teaches to impregnate polystyrene crosslinked with 0.01-0.25% DVB with $CO_2$ under pressure at a temperature below the Tg until at least 2% $CO_2$ was absorbed.

U.S. Pat. No. 3,243,485 teaches to impregnate films or sheets of polystyrene in dry ice.

None of these patents teaches to enhance the expandability of polymeric foam articles by the use of $CO_2$ or any other pneumatogen.

BRIEF SUMMARY OF THE INVENTION

We have now found that in cases where the blowing agent is depleted by the pre-expansion step, the foamed articles can be re-impregnated by contacting the foam articles with gas, liquid, or solid carbon dioxide, air or other inorganic blowing agents for a time sufficient to accomplish the impregnation and further expand the article.

DETAILED DESCRIPTION OF THE INVENTION

The process of this invention relates to the molding and thermoforming of polymeric foams containing either organic or inorganic gases as blowing agents.

The polymer foam articles suitable for the process may be polystyrene, styrene copolymers, polymethyl methacrylate, methyl methacrylate copolymers, polyphenylene oxide, crosslinked variations thereof and interpenetrating networks thereof. Particularly suitable copolymers of styrene are those copolymers with from 5 to 35 mole percent of maleic anhydride and its derivatives such as the imide, N-alkylimide, N-phenylimide, esters, half acids and half esters. Other suitable copolymers are styrene-acrylonitrile, acrylonitrilebutadienestyrene, styrene-methyl methacrylate, styreneacrylic acid, styrene-methacrylic acid, the rubber modified high impact styrene copolymers, polyethylene, and polypropylene.

The volatile blowing agents useful in producing expandable polymers are one or more compounds selected from aliphatic hydrocarbons containing from 4 to 6 carbon atoms in the molecule, including butane, pentane, cyclopentane, hexane, and cyclohexane. The most preferred blowing agents for direct injection processes are the chlorofluoromethanes available under the Trade names Freon and Isotron.

The inorganic gases useful as blowing agents may be gas, liquid or solid carbon dioxide, nitrogen, air and other pneumatogens. As is known, when these agents are used as primary blowing agents for the named polymers, the agent escapes exceedingly fast from the polymer foams even at room temperature, and after pre-expansion, the foams no longer contain enough blowing agent to allow the foams to be further expanded adequately during the molding process. It is therefore necessary to reimpregnate the foam articles with the same or a different gas. In the case of carbon dioxide, the polymer need only be allowed to stand in the presence of carbon dioxide gas at atmospheric pressure or dry ice powder or nuggets for times from 1 hour to 2 days. Compressed air (30 psig) has been used successfully for the reimpregnation but requires longer times of exposure to the gas.

The use of these pneumatogens eliminates the objections encountered when the organic hydrocarbon blowing agents are used exclusively. Thus, no toxic fumes are given off during the molding cycles. Further, there are no residual vapors given off by the moldings after removal from the mold. Combinations of hydrocarbon and $CO_2$ are effectively used.

The following examples are meant to further illustrate the invention, but not to limit the claims.

EXAMPLE I

A styrene/maleic anhydride copolymer having 14% anhydride was extruded in an extruder having increasingly hotter stages. Near the end of the extruder, dichlorodifluoromethane was added and mixed into the copolymer melt. The mixture was then added to a second in-line extruder in which the copolymer was cooled to form an expandable mixture. The product was extruded through a circular die and allowed to expand. The resulting foam was pulled over a sizing mandrel, slit and wound into a roll. The foam was aged for 201 days. When expanded by heating for 10 minutes at 135° C., its final volume was 84 percent greater than its unexpanded volume.

Another sample of the same 201 day old foam was placed in a chamber that contained only carbon dioxide at atmospheric pressure and kept there for five hours. It was then removed from the chamber and immediately expanded at 135° C. for 10 minutes. Its final volume was 135 percent greater than its unexpanded volume. The carbon dioxide exposure therefore enabled the foam to expand an additional 51 percent.

A sample of the 201 day old foam was placed in a chamber with carbon dioxide for 17 hours and immediately expanded at the same time/temperature conditions as above. Its final volume was 129 percent greater than its unexpanded volume. Similarly, a sample was exposed in the carbon dioxide chamber for 22 hours and expanded to a final volume 145 percent greater than its unexpanded volume.

EXAMPLE II

A foam made as in Example I from a copolymer of styrene and 8% of maleic anhydride with chlorodifluoromethane added in the extruder was aged for 29 days. When expanded by heating for 10 minutes at 120° C., its final volume was only 21 percent greater than its unexpanded volume.

Another sample of the same foam, aged for 33 days, was exposed for 5 hours in the carbon dioxide chamber and then immediately expanded for 10 minutes at 120° C. Its final volume was 82 percent greater than its unexpanded volume. The carbon dioxide exposure enabled the foam to expand an additional 61 percentage points.

EXAMPLE III

A foam made as in Example I from a copolymer of styrene and 8% maleic anhydride and with a 40/60 mixture of trichlorofluoromethane/dichlorodifluoromethane added in the extruder was aged for 33 days. When expanded by heating for 10 minutes at 120° C., its final volume was 122 percent greater than its unexpanded volume.

Another sample of the 33 day old foam was exposed for 5 hours in the carbon dioxide chamber and then immediately expanded for 10 minutes at 120° C. Its final volume was 171 percent greater than its unexpanded volume. The carbon dioxide exposure enabled the foam to expand an additional 49 percentage points.

EXAMPLE IV

A foam laminate consisting of a copolymer of styrene and 8% maleic anhydride laminated between layers of a styrenemaleic anhydride copolymer containing 10% of a diene rubber was made and extruded with chlorodifluoromethane. After aging, the foam laminate was heated for 10 minutes at 120° C. to give a foam having a volume 43% greater than its unexpanded volume.

Another sample of the aged laminate was exposed for 5 hours in the carbon dioxide chamber and then immediately expanded for 10 minutes at 120° C. Its final volume was 74% greater than its unexpanded volume. The carbon dioxide exposure enabled the laminate to expand an additional 31 percentage points.

EXAMPLE V

The process of Example IV was repeated replacing the laminate with a laminate having a copolymer of styrene and 14% maleic anhydride as core and a layer of a styrene-maleic anhydride containing 15% of diene rubber on each surface.

After proper aging, a sample of the laminate was heated for 10 minutes at 120° C. to give a foam having 55% greater volume than its unexpanded volume. After exposure to a carbon dioxide chamber for 5 hours, a further sample of the aged foam was immediately heated as before and gave a volume 87% greater than its unexpanded volume. This was an increase of 32 percentage points in expansion after exposure to carbon dioxide.

EXAMPLE VI

A sample of styrene-methacrylic acid copolymer containing 12% acid was extruded with dichlorodifluoromethane and the resultant foam aged 6 days. The aged foam was heated for 10 minutes at 120° C. to give a foam having 48% greater volume than the unexpanded material. A second sample was treated for 5 hours in the carbon dioxide chamber and immediately heated as before. The final volume was 103% of the unexpanded volume. The carbon dioxide treatment thus enabled the foam to expand an additional 55 percentage points.

EXAMPLE VII

A sample of the styrene-methacrylic acid copolymer containing 12% acid from Example VI was extruded with chlorodifluoromethane and the resultant foam aged 6 days. The aged foam was heated for 10 minutes at 120° C. to give a foam having 24% greater volume than the unexpanded material. A second sample was treated for 5 hours in the carbon dioxide chamber and immediately heated as before. The final volume was 71% of the unexpanded volume. The carbon dioxide treatment thus enabled the foam to expand an additional 47 percentage points.

We claim:

1. A process for enhancing the expansion of foams of polystyrene, styrene copolymers, polymethyl methacrylate, methyl methacrylate copolymers, polyphenylene oxide, copolymers of styrene with from 5 to 35 mole percent of maleic anhydride and its derivatives, styrene-acrylonitrile, acrylonitrile-butadiene-styrene, styrene-methyl methacrylate, styrene-acrylic acid, styrene-methacrylic acid, the rubber modified high impact styrene copolymers, polyethylene, and polypropylene comprising the steps of
   (a) impregnating the polymer with a blowing agent in a first extruder and immediately cooling the polymer in a second extruder;
   (b) expanding the polymer by extrusion of the polymer to form a foamed sheet;
   (c) aging the foam sheet in air for 1-100 days;
   (d) impregnating the foamed sheet with gas, liquid, or solid carbon dioxide; and
   (e) immediately heating the impregnated foam sheet to further expand the sheet.

2. The process of claim 1 wherein the styrene polymer is polystyrene.
3. The process of claim 1 wherein the styrene copolymer is a styrene-maleic anhydride copolymer containing 5 to 35 mole-% maleic anhydride.
4. The process of claim 1 wherein the styrene copolymer is a styrene-acrylonitrile copolymer.
5. The process of claim 1 wherein the styrene copolymer is an acrylonitrile-butadiene-styrene copolymer.
6. The process of claim 1 wherein the styrene copolymer is a styrene-methyl methacrylate copolymer.
7. The process of claim 1 wherein the styrene copolymer is a high impact rubber modified polystyrene.
8. The process of claim 1 wherein the styrene copolymer is a styrene-methacrylic acid copolymer.
9. The process of claim 1 wherein the polymer foam is polyethylene.
10. The process of claim 1 wherein the polymer foam is polypropylene.

* * * * *